(12) United States Patent
Ichinose

(10) Patent No.: US 6,602,918 B1
(45) Date of Patent: Aug. 5, 2003

(54) PROCESSES OF PRODUCING A TITANIUM OXIDE-FORMING SOLUTION AND A DISPERSION WITH CRYSTALLINE TITANIUM OXIDE PARTICLES

(75) Inventor: Hiromichi Ichinose, Saga (JP)

(73) Assignee: Saga Prefecture, Saga (JP)

( * ) Notice: Subject to any disclaimer, the term of this patent is extended or adjusted under 35 U.S.C. 154(b) by 0 days.

(21) Appl. No.: 09/512,656

(22) Filed: Feb. 24, 2000

(30) Foreign Application Priority Data

| Feb. 26, 1999 | (JP) | ............................................. 11-050868 |
| Feb. 26, 1999 | (JP) | ............................................. 11-050869 |
| Aug. 6, 1999 | (JP) | ............................................. 11-224190 |

(51) Int. Cl.$^7$ .............................. B01F 3/12; C09C 1/36
(52) U.S. Cl. ...................... 516/90; 106/286.4; 106/437; 423/608; 423/612
(58) Field of Search .................. 516/90; 106/286.4, 106/437; 502/350; 423/608, 612

(56) References Cited

U.S. PATENT DOCUMENTS

| 4,061,583 A | | 12/1977 | Murata et al. ............. 252/62.3 |
| 5,403,513 A | | 4/1995 | Sato et al. ..................... 516/90 |
| 5,759,251 A | * | 6/1998 | Nakamura et al. ........ 106/286.4 |
| 6,099,969 A | * | 8/2000 | Ogata ......................... 106/437 |
| 6,107,241 A | * | 8/2000 | Ogata et al. ................. 423/608 |
| 6,429,169 B1 | * | 8/2002 | Ichinose ..................... 423/608 |

FOREIGN PATENT DOCUMENTS

| EP | 0 846 494 A1 | * | 6/1998 |

OTHER PUBLICATIONS

Ichinose et al., "Properties of Anatase Films for photocatlyst from peroxotitanic acid solution and peroxo–Modified Anatase sol", J. Cer. Soc. of Japan, International Edition, Vo. 104, No. 10, (Oct. 1996) pp. 909–912.*

Ichinose et al., "Synthesis of peroxo–Modified Anatase sol from peroxo Titanic Acid Solution", Journal of the Ceramic Society of Japan, International Edition, vol. 104, No. 8, (Aug. 1996) pp. 697–700.*

Chemical Abstracts, vol. 120, No. 8, Feb. 21, 1994 Columbus, Ohio, US; FANG: XP002139805 *abstract* & WUHAN DAXUE XUEBA, ZIRAN KEXUBEAN, vol. 3, 1992, pp. 78–82, china, AN 120: 80604.

Chemical Abstracts, vol. 108, No. 14, Apr. 4, 1988 Columbus, Ohio, US; Abstract No. 115112, Sato, Goro: XP002139806 *abstract* & JP 62 283817 A (Catalyst and Chemicals Industries).

* cited by examiner

Primary Examiner—Daniel S. Metzmaier
(74) Attorney, Agent, or Firm—Armstrong, Westerman & Hattori, LLP

(57) ABSTRACT

The invention provides a process of producing a titanium oxide-forming solution, wherein a hydrogen peroxide solution is added to a titanium-containing starting aqueous solution to form a peroxotitanium complex, a basic substance is then added to the peroxotitanium complex to obtain a solution which is in turn let stand or heated, thereby forming a precipitate of a peroxotitanium hydrate polymer, at least a dissolved component derived from the titanium-containing starting aqueous solution, except water, is then removed from the precipitate, and a hydroxide peroxide solution is finally allowed to act on a dissolved component-free precipitate. The invention also provides a dispersion with titanium oxide dispersed therein.

14 Claims, 5 Drawing Sheets

PROCESSES OF PRODUCING A TITANIUM OXIDE-FORMING SOLUTION AND A DISPERSION WITH CRYSTALLINE TITANIUM OXIDE PARTICLES

BACKGROUND OF THE INVENTION

The present invention relates to a process of producing a titanium oxide coating agent for the purpose of forming a titanium oxide film on a substrate, and a titanium oxide film coating formed using such a coating agent.

Among processes of forming a titanium oxide film, there are a coating process wherein a titanium oxide powder slurry or an aqueous solution of titanium chloride is coated and then fired on a substrate, a sol-gel process wherein a sol prepared by hydrolysis of a metal alkoxide is coated and then fired on a substrate, a sputtering process wherein an oxide target is sputtered in a high vacuum to form a film on a substrate, a CVD process wherein an organometallic compound or a halide is decomposed upon volatilization in a heating furnace to form a film on a substrate, a plasma spray coating process wherein solid particles are fused by a plasma generated in the atmosphere to spray them onto the surface of a substrate, etc. Of these processes, the process using a coating solution is now considered to be simple and of high practicality for the formation of a titanium oxide film.

With the titanium oxide powder coating process that is simple, however, it is difficult to obtain an intimate film in close contact with the substrate. Generally, high synthesis temperatures are needed for titanium oxide film formation, and so it is required to use a heat-resistant substrate capable of standing up to such synthesis temperatures. Thus, there is some limit to the type of available substrate.

Another problem with this process is that harmful halogen compounds, etc. are generated by firing because acids or suitable organic dispersants are commonly used to obtain a dispersion solution of titanium oxide fine particles. In the process of coating and firing an aqueous solution of titanium chloride, titanium sulfate, etc., too, harmful halogen compounds are generated. In addition, firing temperatures as high as several hundred 0° C. are needed.

A commercially available titanium oxide sol prepared by the sol-gel process is industrially advantageous in that it can be coated and impregnated, coated over a large area and synthesized at low temperatures. One problem with this sol is, however, that the raw materials are not only expensive but also chemically unstable and susceptible to influences by temperature control and atmospheres and so hard to handle, because the synthesis must be carried out using organic metals such as titanium tetraisopropoxide and tetrabutyl titanate.

Another problem with the sol-gel process is that it is unsuitable for materials susceptible to attacks by acids because heating at 400° C. or higher is needed for removal by firing of acids and organic substances contained in the starting sol. Low-temperature firing is likely to yield a porous product.

Yet another problem with the sol-gel process is that it involves complicated process steps and has to use an organic solvent. A titanium oxide sol prepared by the sol-gel process contains acids and alkalis or organic substances, and so offers a corrosion problem with respect to the substrate material to be coated. A further problem is that temperatures of at least 400° C. are needed for the decomposition of the organic substances, and so harmful by-products such as halides and nitrogen oxides are generated during firing by heating.

With the prior art processes, it is thus difficult to prepare a crystalline titania film of high density at low temperatures. For the sol-gel process capable of preparing the titania film at a relatively low temperature, on the other hand, the organic substances, acids, etc. must be decomposed and removed by thermal treatment. Otherwise, this makes the titania film porous; that is, the thermal treatment temperature should be relatively high so as to prepare a film of high density. Besides, such aids are unfavorable because harmful substances such as nitrogen oxides and organic substance vapors are generated by the thermal treatment.

When a titanium oxide film is formed of a peroxotitanium hydrate, on the other hand, it is known that a film having good properties can be obtained at a relatively low temperature. It is also known that the peroxotitanium hydrate is formed by direct addition of an aqueous solution of hydrogen peroxide to a solution of titanium tetrachloride, titanium sulfate or the like thereby forming peroxotitanium hydrate ions, and permitting the hydrate ions to precipitate out in a solid form.

At pH 1 or higher, the peroxotitanium hydrate ions are also generated in the form of polynuclear ions containing at least two titanium atoms. At normal temperature, these hydrate ions condense slowly and then precipitate out. It is thus difficult to use the peroxotitanium hydrate ions at pH 1 or higher as a titanium oxide coating agent; in other words, there is some limit to the type of substrate to which a strong acid coating agent of pH 1 or less can be applied. In addition, harmful substances such as hydrogen halides and sulfur oxides are generated by thermal treatment from halogens, sulfur, etc. included in the hydrate ions.

To prepare a titanium oxide film of high purity, JP62-252319(A) has proposed to add a hydrogen peroxide solution directly to hydrogenated titanium or alkoxytitanium for dissolution, thereby producing peroxidized titanium, i.e., a substance regarded as a peroxotitanium hydrate.

A problem with these titanium raw materials is, however, that their unstableness causes some considerable exothermic reaction when the hydrogen peroxide solution acts thereon, resulting in adverse influences such as thermal decomposition of the raw materials and the product. When the peroxotitanium hydrate is produced in large amounts, therefore, the resulting peroxotitanic acid polymerizes and increases in viscosity. Worst of all, particles grow to such an extent that the transmission of light through the solution is cut off and so the solution becomes turbid. When the solution is used as a coating agent, this in turn causes the close contact of the film with an associated substrate to become worse and the density of the film to drop as well.

JP63-35419(A) and JP01-224220(A) disclose a process of producing an aqueous solution referred therein to as a titanyl ion hydrogen peroxide complex or titanic acid and regarded as a peroxotitanium hydrate by adding a hydrogen peroxide solution to a hydrous titanium oxide gel or sol.

Upon the direct addition of the hydrogen peroxide solution to titanium hydroxide, however, much heat is generated due to the simultaneous occurrence of peroxidization and solution formation and, hence, sufficient cooling under agitation is needed. However, as the amount of the peroxotitanium hydrate to be produced increases, temperature control becomes difficult. Unless sufficient cooling can be carried out, a polymer grows in the form of particles due to viscosity increases and condensation. This may in turn cause the solution to become turbid.

When a gel or sol of hydrous titanium oxide is prepared, it is common to add a basic substance such as ammonia thereto. However, impurities, i.e., cations such as ammonium ions and anions such as chlorine ions are likely to be taken in and absorbed on the gel or sol due to momentary precipitation of hydrous titanium oxide. In particular, the presence of anionic impurities such as chlorine ions and sulfate ions may often promote condensation of a peroxotitanium hydrate formed after the addition of a hydrogen peroxide solution, resulting in a failure in obtaining a transparent aqueous solution. In addition, complete removal of impurities is difficult to achieve even when the hydrous titanium oxide is washed with distilled water. In view of stable production of peroxotitanium hydrate, there is thus a grove problem.

In Japanese Patent Nos. 2875993 and 2938376, the inventors have already showed that a coating agent with anatase ultrafine particles dispersed can be obtained by heating an aqueous solution of peroxotitanium hydrate, thereby making it possible to form a crystalline titania film of improved adhesion.

With the processes already proposed by the inventors, it is possible to form a crystalline titania film that is more improved in terms of adhesion than that obtained by a conventional process. However, when an anatase sol is prepared by heating an aqueous solution of peroxotitanium hydrate while the amount of cation residues such as ammonium ion residues is large, peroxo groups are less susceptible to decomposition, yielding large particles. When these particles are used as a coating agent, a problem often arises in conjunction with adhesion or density.

Especially when anionic impurities such as chlorine ions and sulfate ions remain in a large amount, the polymerization of peroxotitanic acid formed after the addition of a hydrogen peroxide solution is often promoted, resulting in a failure in obtaining a transparent aqueous solution or a density increase. Even with a titanium hydrate with ionic impurities adsorbed thereon, it is prima facie possible to prepare a transparent solution of peroxotitanic acid if a hydrogen peroxide solution is allowed to act thereon after the concentration of ionic impurities is reduced by repeating washing with purified water. However, too long a time is needed for washing because as the lower the impurity concentration, the more difficult it is to precipitate the hydrate.

It is thus strongly desired to provide a production process that can be more easily carried out than a process using the titania film-forming solution proposed by the inventors in Japanese Patent Nos. 2875993 and 2938376 and provide a solution enabling a stable titania film of improved properties to be obtained even when produced in large amounts.

Accomplished to eliminate such problems as explained with reference to the prior art, the present invention provides a new process of producing an aqueous solution of peroxotitanium hydrate. In other words, it is one object of the present invention to prevent condensation due to thermal influences or growth of particles than needed in the process of producing an aqueous solution of peroxotitanium hydrate with a hydrogen peroxide solution, which may otherwise cause a film adhesion or density drop when the aqueous solution is used as a coating agent. It is another object of the present invention to obtain a titanium oxide-forming solution that makes it possible to form a titanium oxide coating film of improved adhesion and increased density.

The present invention also provides a new process of producing a crystalline titanium oxide particle that is also useful as a titanium oxide-forming film coating agent. In other words, it is one object of the present invention to prevent condensation due to thermal influences or growth of particles than needed in the process of producing an aqueous solution of peroxotitanium hydrate with a hydrogen peroxide solution, which may otherwise cause a film adhesion or density drop when the aqueous solution is used as a coating agent. It is yet another object of the present invention to obtain a crystlline titanium oxide particle that makes it possible to form a titanium oxide coating film of improved adhesion and increased density.

It is a further object of the present invention to provide a titanium oxide-forming solution usable as a titanium oxide coating agent or the like, and a process of producing the same. It is a further object of the present invention to provide a stable titanium oxide-forming solution with which problems with a conventional process of producing titanium oxides can be solved, and a new process of producing a sol with anatase fine particles dispersed therein, which can be obtained from the same. It is a further object of the present invention to provide a production process wherein solution formation can be promoted by adjustment of impurity ions in the reaction step at which a titanium oxide-forming solution is obtained from the starting materials.

SUMMARY OF THE INVENTION

Figure 1:
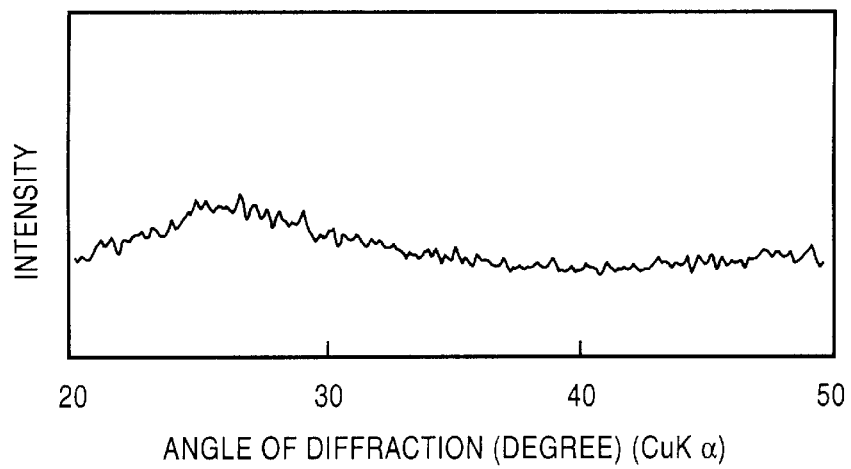
FIG. 1 is illustrative of the results of X-ray diffraction of the precipitate obtained in Example 1-1.

According to one aspect of the present invention, there is provided a process of producing a titanium oxide-forming solution, wherein:

a hydrogen peroxide solution is added to a titanium-containing starting aqueous solution to form a peroxotitanium complex, a basic substance is then added to the peroxotitanium complex to obtain a solution which is in turn let stand or heated, thereby forming a precipitate of a peroxotitanium hydrate polymer, at least a dissolved component derived from said titanium-containing starting aqueous solution, except water, is then removed from said precipitate, and a hydroxide peroxide solution is finally allowed to act on a dissolved component-free precipitate.

In this process of producing a titanium oxide-forming solution, a dissolved component derived from the basic substance added for the formation of the hydrate, except water, too, should preferably be removed.

In this process of producing a titanium oxide-forming solution, removal of the dissolved components should preferably be carried out by water washing or an ion exchange reaction.

In this process of producing a titanium oxide-forming solution, the reaction of the precipitate of the peroxotitanium hydrate with the hydrogen peroxide solution should preferably be carried out at a temperature of 40° C. or lower.

According to another aspect of the invention, there is provided a process of producing a titanium oxide-forming solution, wherein:

a basic substance having hydroxyl groups in excess of the amount of titanium is added to metallic titanium or a solid titanium compound containing at least one of oxygen and hydrogen and a hydrogen peroxide solution is then added thereto, thereby forming a solution, in which solution a concentration of cations except a titanium ion, a titanium-containing ion and a hydrogen ion is at most one-half a concentration of titanium.

According to yet another aspect of the invention, there is provided a process of producing a titanium oxide-forming solution, wherein:

a basic substance having hydroxyl groups in excess of the amount of titanium is added to metallic titanium or a solid titanium compound containing at least one of oxygen and hydrogen and a hydrogen peroxide solution is then added thereto, thereby forming a solution, and a step for removal of cations except a titanium ion, a titanium-containing ion and a hydrogen ion from the solution and decomposition of an excessive portion of the hydrogen peroxide solution is repeated twice or more while the solution is maintained at pH 3.0 to 10.

In this process of producing a titanium oxide-forming solution, the solid titanium compound should preferably be a titanium hydrate formed by adding a basic substance to a titanium compound.

In this process of producing a titanium oxide-forming solution, the basic compound having hydroxyl groups in an amount that is at least twice the amount of titanium should preferably be added.

According to a further aspect of the present invention, there is provided a process of producing a titanium oxide-forming solution comprising a solid titanium compound containing at least one of metallic titanium, oxygen and hydrogen and a basic substance added thereto together with a hydrogen peroxide solution, said basic substance having a hydroxyl group in excess of the amount of titanium, wherein the concentration of cations contained in said solution, except a titanium ion, a titanium-containing ion and a hydrogen ion, is at most half the concentration of titanium.

According to a further aspect of the present invention, there is provided a process of producing a titanium oxide-forming solution, wherein:

a basic substance having a hydroxyl group in excess of the amount of titanium is added together with a hydrogen peroxide solution to a solid titanium compound containing at least one of metallic titanium, oxygen and hydrogen to form a solution, and a step for removal of cations contained in said solution, except a titanium ion, a titanium-containing ion and a hydrogen ion, and decomposition of an excessive portion of said hydrogen peroxide solution has been repeated at least twice while said solution is maintained at pH 3 to 10.

In this process of producing a titanium oxide-forming solution, the solid titanium compound should preferably be a titanium hydrate formed by adding the basic compound to the titanium compound.

In this process of producing a titanium oxide-forming solution, the basic substance having a hydroxyl group in an amount that is at least twice as large as the amount of titanium should preferably be added to the titanium compound.

According to a further aspect of the present invention, there is provided a process of producing a titanium oxide-forming solution, wherein:

a basic substance having hydroxyl groups in excess of an amount of titanium is added to metallic titanium or a solid titanium compound containing at least one of oxygen and hydrogen for precipitation and separation of a titanium compound, the titanium compound is then washed for removal of ations except a titanium ion, a titanium-containing ion and hydrogen ion, and a hydrogen peroxide solution is finally added to the titanium compound so that the titanium compound is dissolved said hydrogen peroxide solution.

In this process of producing a titanium oxide-forming solution, the concentration of cations in the solution, except a titanium ion, a titanium-containing ion and a hydrogen ion, should preferably be at most one-half the concentration of titanium.

In this process of producing a titanium oxide-forming solution, the solution should preferably contain peroxotitanium.

According to a further aspect of the present invention, there is provided a process of producing a titanium oxide coating agent, wherein:

a basic substance having hydroxyl groups in excess of the amount of titanium is added to metallic titanium or a solid titanium compound containing at least one of oxygen and hydrogen and a hydrogen peroxide solution is then added thereto, thereby forming a solution, removal of cations contained in said solution, except a titanium ion, a titanium-containing ion and a hydrogen ion, and decomposition of an excessive portion of the hydrogen peroxide solution are then repeated at least twice while the solution is maintained at pH 3 to 10, thereby allowing the concentration of cations except a titanium ion, a titanium-containing ion and a hydrogen ion to be at most one-half the concentration of titanium, and the solution is finally thermally treated at a temperature of 80° C. or higher for precipitation of an anatase particle.

According to a further aspect of the present invention, there is provided a process of producing a solution with a crystalline titanium oxide particle dispersed therein, wherein:

a hydrogen peroxide solution is added to a titanium-containing starting aqueous solution to form a peroxotitanium complex, a basic substance is then added to the peroxotitanium complex to obtain a solution which is in turn let stand or heated, thereby forming a precipitate of a peroxotitanium hydrate polymer, at least a dissolved component derived from the titanium-containing aqueous solution, except water, is then removed, and the peroxotitanium hydrate polymer is heated at a temperature of 70° C. or higher while water remains unseparated therefrom.

In this process of producing a solution with a crystalline titanium oxide particle dispersed therein, a dissolved component derived from the basic substance added for hydrate formation, except water, should preferably be removed, too.

In this process of producing a solution with a crystalline titanium oxide particle dispersed therein, removal of the dissolved component(s) should preferably be carried out by water washing or an ion exchange reaction.

DESCRIPTION OF THE PREFERRED EMBODIMENT

According to the present invention, it has now been found that in the process of producing a titanium oxide-forming solution via a peroxotitanium hydrate, a titanium oxide-forming solution of improved properties can be obtained by elimination of factors that promote condensation, etc. therefrom.

A: PROCESS 1 OF PRODUCING A TITANIUM OXIDE-FORMING SOLUTION

More exactly, reaction products that are factors of promoting condensation, etc. in the reaction process or impurities coming from the starting material are prematurely removed to prevent the condensation, etc. In addition, the exothermic reaction of the starting titanium compound with the hydrogen peroxide solution is broken down into the first and second exothermic reaction stages instead of being allowed to proceed continuously, so that problems caused by the exothermic reaction can be solved. This process is made up of the following steps.

(1) STEP OF PRECIPITATION OF A PEROXOTITANIUM HYDRATE POLYMER

First, a suitable amount of a hydrogen peroxide solution is added to a soluble titanium compound such as titanium tetrachloride upon dilution with water to form a brown peroxo complex. Then, a basic substance such as ammonia is added to the peroxo complex to prepare a yellow aqueous solution of peroxotitanium hydrate. Finally, this aqueous solution is let stand at normal temperature or heated for precipitation of a peroxotitanium hydrate polymer.

(2) STEP OF REMOVAL OF IONIC SUBSTANCES AND IMPURITIES

The solution with the precipitated peroxotitanium hydrate polymer contained therein is washed or otherwise treated by filtration and washing to remove ammonium ions and chlorine ions contained therein or impurities derived from the starting material.

(3) STEP OF FORMATION OF AN AQUEOUS PEROXO HYDRATE SOLUTION

A hydrogen peroxide solution is added to the peroxotitanium hydrate from which ionic substances and impurities are removed by washing treatment while the hydrate is cooled down to room temperature or lower, thereby preparing a transparent, yellow, meta-stable aqueous solution of peroxo-titanium hydrate.

Through the aforesaid steps, it is possible to obtain a titanium oxide-forming solution while condensation is inhibited.

The soluble titanium compound used as the starting material in the process of the present invention, for instance, may include titanium tetrachloride, titanium sulfate, titanium nitrate and alkoxy titanium.

The amount of the hydrogen peroxide solution to be added to the aqueous solution of the soluble titanium compound should be at least 1 as represented in terms of the hydrogen peroxide-to-titanium molar ratio. At less than 1, peroxidization is not fully completed. In addition, some of the added hydrogen peroxide solution takes no part in the reaction. It is thus desired that the hydrogen peroxide-to-titanium molar rate be in excess of 1.

Almost momentarily upon the addition of the hydrogen peroxide solution to the soluble titanium-containing solution, peroxidization takes place, yielding a solution wherein the peroxotitanium hydrate is present primarily in the form of cations at pH 3 or less, and in the form of anions at pH 3 or higher. This is probably because the higher the pH, the more prematurely condensation takes place, so that an amorphous peroxotitanium hydrate polymer can be precipitated. When the basic substance is added, too, much time is needed at a low pH level for precipitation of the peroxotitanium hydrate polymer. It is thus preferable to add the basic substance until a pH level of 3 or higher is obtained. More preferably, the pH should be regulated to the neutral region.

When yellow precipitates are obtained from the transparent, yellow solution of peroxotitanium hydrate formed by the addition of the basic substance, it is preferable to let the solution stand at room temperature. If heating is applied, however, it is possible to promote hydrate precipitation. It is here noted that this precipitation can be further promoted by agitation. However, heating should preferably be done at a temperature of 80° C. or lower because anatase grains may occur at a temperature of 80° C. or higher.

At the step of removal from the precipitate-containing liquid of ammonium ions and chlorine ions contained therein or impurities derived from the starting material, techniques such as decantation, filtering and washing and centrifuging, reactions such as ion exchange reaction or techniques such as reverse osmosis may be used for removal of ionic substances.

Impurities should preferably be removed as much as possible, because a large amount of remnant impurities has an adverse influence on the stability and properties of the finally obtained aqueous solution of peroxotitanium hydrate. In particular, anions such as chlorine ions are considered to promote the condensation of the peroxotitanium hydrate. In some cases, insufficient removal of such anions causes the solution to become opaque or turbid. When cations such as ammonium ions remain, on the other hand, a peroxotitanium hydrate-containing transparent, yellow aqueous solution can be obtained if anions are fully removed.

For the treatment of the precipitates, they should remain undried, because the precipitates dehydrate and solidify upon drying, producing an adverse influence on the subsequent solution preparation step.

When a hydrogen peroxide solution is added to the thus washed liquid with the precipitates contained therein at the next step of forming an aqueous solution of peroxo hydrate, the amount of the hydrogen peroxide solution to be added should preferably be at least 1 as represented in terms of the hydrogen peroxide-to-titanium ratio. At a ratio of less than 1, it is impossible to obtain a complete solution.

It is also preferable to pre-cool the hydrogen peroxide solution down to 40° C. or lower, because any overheating of the liquid due to reaction heat, etc. can be so prevented that the re-condensation of the solution form of peroxotitanium hydrate can be avoided. During the reaction, the liquid increases largely in viscosity at 40° C. or higher. It is thus required to keep the liquid temperature at 40° C. or lower. Preferably in this regard, it is preferable to cool the liquid down to 20° C. or lower.

In the conventional process wherein a hydrogen peroxide solution is added directly to titanium hydroxide or titanium oxide hydrate, peroxidization and dissolution take place in a successive fashion, resulting in the generation of much heat. When the already peroxidized peroxotitanium hydrate polymer is formed into a solution, however, the reaction proceeds relatively gently with less heat, so that a high-quality aqueous solution of peroxotitanium hydrate can be obtained.

At this solution-forming step, it is preferable to add the hydrogen peroxide solution to the liquid with the precipitates contained therein after the latter is pre-cooled or under cooling conditions. This is because when the solution is heated to room temperature or higher, the peroxo-titanium hydrate in a solution form often re-condenses, causing the solution to thicken and opacify with the formation of fine particles and thereby making it impossible to obtain the end titanium oxide coating agent.

If the titanium oxide-forming solution of the invention is thermally treated at less than 200° C. after applied as a coating agent, it is then possible to obtain a noncrystalline titanium oxide film. If this is thermally treated at 200° C. or higher, on the other hand, it is then possible to obtain an intimate, crystalline titanium oxide film. These films are excellent in acid resistance, and so may be used as various anti-corrosive coatings.

An anatase sol solution that has been thermally treated at 80° C. or higher is useful as a coating agent for materials incapable of any thermal treatment, because it can yield a crystalline titania film in simple coating operation. The thus obtained film may be used for various purposes, e.g., as protecting coatings and photocatalysts. According to this process, it is also possible to obtain a film of relatively high density and improved adhesion at a relatively low temperature.

The titanium oxide coating agent of the present invention acts as a dispersing agent for various fine particles, and may be dispersed by ultrasonic means or other means inclusive of a ball mill upon mixed with solid fine particles. If other material is carried on or dispersed in a titanium oxide film obtained by coating, drying and firing of the dispersion, it is then possible to obtain a composite material. The titanium oxide coating agent of the present invention may be applied to every substrate: ceramic, porcelain, metal, plastic, fiber and building material substrates, and everything capable of standing up to thermal treatments suitable for particular purposes. With this coating agent, it is also possible to treat the interiors of porous materials and the surfaces of powders. Thus, the titanium oxide coating agent prepared according to the present invention may find applications in producing protective coatings for various material products, photocatalyst films, ultraviolet cut coatings, colored coating films, dielectric films, film sensors and titanium oxide sols.

B: PROCESS 2 OF PRODUCING A TITANIUM OXIDE-FORMING SOLUTION

The present invention also provides a more improved titanium oxide-forming solution usable for the formation of titanium oxide having improved properties by using a specific starting material as the raw material for the preparation of a titanium compound and combining a step of forming a novel titanium compound into a solution with a step of forming a titanium oxide in the solution, and a process of producing such a titanium oxide-forming solution.

According to this aspect of the present invention, it has been found that a titanium oxide-forming solution suitable as a titanium oxide coating agent having a stabilized peroxo group or the like can be obtained by adding a basic substance having hydroxyl groups in excess of the amount of titanium is added to metallic titanium or a titanium compound containing at least one of oxygen and hydrogen, then allowing a hydroxide peroxide solution to act on the titanium compound for dissolution, thereby forming a solution, and finally decreasing the concentration of the basic substance in the solution to a given level or lower without any lowering of titanium yields.

In particular, the present invention provides a process of producing an aqueous solution of peroxotitanic acid useful as a stabilized titanium oxide coating agent or the like by use of titanium such as metallic titanium or a compound of titanium with at least one of hydrogen and oxygen such as hydrogenated titanium and titanium oxide, which have generally been not used as the raw material for a dispersing agent comprising a titanium oxide coating agent.

A solution formed by adding a basic substance and a hydrogen peroxide solution to titanium, hydrogenated titanium, a titanium oxide or the like may be kept in a transparent solution state for a few minutes to a few days upon formed although varying depending on the type and amount of the basic substance used for dissolution and the amount of the hydrogen peroxide solution added. However, this solution is unstable by itself because it becomes cloudy or undergoes gelation with time. Although the solution may be stored under cooling conditions, a problem arises in connection with long-term storage.

In view of the fact that the instability of such a titanium-containing solution is ascribable to basic substance and hydrogen peroxide residues, the basic substance is removed until its concentration is reduced to the predetermined level or lower while the hydrogen peroxide is decomposed. In this way, it is possible to obtain a stable titanium-containing compound.

In the titanium-containing solution prepared by the addition of the basic substance in excess of titanium and hydrogen peroxide, the dissolved titanium is present in an anion form comprising a complex with a hydroxyl group bonded thereto. Therefore, if a cation exchange or capture substance such as a cation exchange resin or zeolite is added into the solution and then removed, it is possible to remove anions derived from the basic substance present in the solution without having any influence on the dissolved titanium.

If cations derived from the basic substance are removed as by a cation exchange resin, however, then the pH of the solution changes due to an ion exchange of the cations derived from the basic substance for hydrogen ions. As the pH is lower than a certain value, titanium-containing ions in the solution, for instance, peroxotitanic acid ions change to cations such as titanium ions, which are then captured by the cation exchange resin, thereby allowing titanium to vanish from the solution. Thus, removal of the cations derived from the basic substance in the solution must be carried out at pH 3 or higher, and preferably pH 4 or higher.

It is also required to decompose an excessive portion of hydrogen peroxide added into the solution. However, too rapid decomposition of hydrogen peroxide offers some problems such as pH increases and precipitation of the dissolved titanium compound. It is thus preferable to avoid a pH increase exceeding 10, and preferably 9.

The process according to the present invention is therefore characterized in that removal of the cations derived from the basic substance and decomposition of hydrogen peroxide are carried out in plural operations so as to keep the pH of the solution at the steps of removing the basic substance and decomposing the hydrogen peroxide within the predetermined range.

By the "concentration of cations in the solution" used herein is intended the total amount of non-dissociated, coordinated and other ions to be measured for analytic purposes, rather than the amount of ions dissociated in the solution. By the "concentration of titanium" used herein is likewise intended the total amount of titanium present in the solution, irrespective of in what form titanium is present in the solution.

One embodiment of removal of the cations derived from the basic substance and decomposition of hydrogen peroxide will now be explained.

1. The basic substance and hydrogen peroxide solution are added to metallic titanium or a compound of titanium with either one of hydrogen and oxygen to prepare a titanium-containing solution. While the solution is maintained at approximately pH 3 to 6 or within a weak acid or neutral range, a cation exchange resin is added to the solution for removal of the cations derived from the basic substance.

2. Then, the titanium-containing solution is let stand, stirred, irradiated with ultrasonic waves or otherwise heated, thereby decomposing the hydrogen peroxide. In this case, the pH increase of the titanium-containing solution is limited to the range of pH 7 to 10.

3. As in 1 above, a small amount of the cation exchange resin is again added to the titanium-containing solution for deionization, thereby removing the cations derived from the basic substance while the solution is kept at approximately pH 3 to 6 or in the weak acid or neutral range. Subsequently, the same treatment as in 2 is carried out.

At the first step of removal of the cations derived from the basic substance, it is impossible to achieve sufficient cation removal because a large amount of hydrogen peroxide is present in the solution. It is thus preferred that the solution is kept in the range of approximately pH 3 to 6, and especially pH 4 to 6. At the subsequent step of decomposition of hydrogen peroxide, the decomposition of hydrogen peroxide must be carried out in the range of approximately pH 7 to 9 because decomposition of a large amount of hydrogen peroxide may possibly lead to precipitation of peroxotitanium hydrate.

At the subsequent step of removal of the cations derived from the basic substance and decomposition of hydrogen peroxide, care must be taken so as to prevent titanium in the titanium oxide-forming solution from vanishing at the cation removal step and avoid polymerization of peroxotitanium which may otherwise yield precipitates, etc.

The concentration in the obtained titanium oxide-forming solution of the cations derived from the basic substance should preferably be as small relative to the concentration of titanium as possible, and especially be at most one-half the concentration of titanium. At such a concentration, the solution is available as a stable coating agent.

For the basic substance herein used for the dissolution of titanium or the titanium compound, ammonia water, an aqueous solution of alkaline metal oxide and an aqueous solution of tetraalkylammonium may be used. However, it is preferable to use metal element-free basic substances such as ammonia water and tetraalkylammonium, because they can be easily removed by volatilization and decomposition when the titanium oxide-forming solution is used as the coating agent to form a titanium oxide coating film. Particular preference is given to ammonia water.

The amount of the basic substance used for the dissolution of titanium or the titanium compound should preferably be at least twice, and especially four times as large as the number of moles of titanium. When used with the titanium compound having no hydroxyl group, the basic substance should preferably be used in an amount that is at least four times, and especially six times as large as the number of moles of titanium.

While the dissolution reaction of the titanium compound with the basic substance and hydrogen peroxide solution may take place at normal temperature, it is noted that the dissolution reaction should preferably be accelerated by heating.

For the titanium-containing material used as the raw material for the titanium oxide-forming solution, metallic titanium obtained from titanium minerals and titanium compounds containing either one of hydrogen and oxygen may be used. Use may also be made of titanium hydrates obtained by adding a hydrogen peroxide solution to an aqueous solution of a soluble titanium compound such as titanium tetrachloride and then adding a basic substance such as ammonia water thereto, and titanium oxides, etc., from which anions such as chloride ions are removed.

In the practice of the invention, removal of the cations derived from the basic substance is achievable not only by use of cation exchange resins, zeolite, etc., but also by use of electrodialysis, dialysis, reverse osmosis, etc., all making use of an ion exchange membrane.

In the practice of the invention, the end solution is prepared from the titanium oxide-forming solution obtained by dissolving metallic titanium or the titanium-containing compound by adding thereto the basic substance and a hydrogen peroxide solution without recourse to operations such as precipitation. Alternatively, the solution with titanium or the titanium compound dissolved therein is let stand or heated for the precipitation of the titanium compound, and the precipitates are then washed to reduce the concentration of the cations derived from the basic substance to the desired level or lower. Finally, the hydrogen peroxide solution is allowed to act on the solution, so that the titanium oxide-forming solution can be prepared.

Alternatively, the concentration of the cations derived from the basic substance in the titanium oxide-forming solution prepared as mentioned above is reduced to ½ or less, and preferably ¼ or less relative to the concentration of titanium by cation removal. Then, the solution is heated to a temperature of 80° C. or higher or thermally treated under pressure in an autoclave, so that a titanium oxide coating agent comprising an anatase sol with anatase fine particles dispersed therein can be prepared.

Moreover, it is required that the amount of the hydrogen peroxide solution added at the step of peroxidizing the titanium compound, wherein the titanium compound is precipitated from the titanium oxide-forming solution and then again put into a solution, be at least 1 as represented by the hydrogen peroxide-to-titanium ratio. At less than 1, it is difficult to complete peroxidization; that is, the hydrogen peroxide solution often decomposes without undergoing any reaction. It is thus preferable to use the hydrogen peroxide solution in an amount that is in excess of the hydrogen peroxide-to-titanium ratio of 1. The reaction may take place at normal temperature or with the application of heat. However, when the raw material used is a stable material such as an oxide, it is preferable to carry out the reaction at a higher temperature because the reaction can proceed rapidly. In this regard, it is noted that the higher the temperature, the more the volatile basic substance such as ammonia is susceptible to escape or the more the hydrogen peroxide itself is susceptible to break down. Consequently, the solution often becomes turbid or is subjected to gelation or precipitation before the raw material is put into a complete solution.

When the solution contains a large amount of the basic substance, the crystallization of the titanium oxide such as anatase is hardly to occur even at an elevated reaction temperature. However, it is preferable to carry out the reaction at 80° C. or lower. The reaction may be accelerated by stirring.

The titanium oxide-forming solution can yield a non-crystalline titanium oxide film upon coated on a substrate and heated at a temperature of less than 200° C., and a crystalline intimate oxide titanium film upon heated to a temperature of 200° C. or higher. These films are excellent in acid resistance, and so may be used as various anti-corrosive coatings.

An anatase sol dispersion solution prepared from the titanium oxide-forming solution according to the present invention is useful as a coating agent for materials incapable of any thermal treatment, because it can yield a crystalline titania film in simple coating operation. The anatase sol dispersion solution, if mixed with the stable titanium oxide-forming solution of the present invention, can be used as a coating agent, thereby forming an anatase film of improved adhesion. If the titanium oxide-forming solution of the present invention is coated on a substrate such as a synthetic resin substrate to form a titanium oxide layer and the anatase sol dispersion solution of the present invention is thereafter coated thereon to form a multilayer structure, it is then possible to prevent decomposition, etc. of organic materials in the substrate due to the photocatalytic action of the surface titanium oxide layer, which may otherwise cause the coated titanium oxide layer to peel off the substrate.

The titanium oxide-forming solution according to the present invention may be used for various purposes, e.g., for the formation of protecting coatings and photocatalyst layers. With this solution, it is also possible to obtain a film of relatively high density and improved adhesion at a relatively low temperature.

Titanium oxide fine particles obtained from the titanium oxide-forming solution of the present invention are so improved in terms of dispersibility that a mixture thereof with various solid fine particles can be dispersed by means of an ultrasonic dispersion device, a ball mill or the like, and then coated, dried and fired to form a titanium oxide film. If other material is carried on or dispersed in the titanium oxide film, it is then possible to obtain a composite material.

The titanium oxide-forming solution of the present invention may be applied to every substrate: ceramic, porcelain, metal, plastic, fiber and building material substrates. With this solution, it is also possible to treat the interiors of porous materials and the surfaces of powders.

C: PROCESS OF PRODUCING A TITANIUM OXIDE-FORMING SOLUTION

According to the present invention, it has now been found that in the process of producing a crystalline titanium oxide particle via a peroxotitanium hydrate, a crystalline particle having improved properties can be obtained directly from the hydrate in a precipitated state while factors ascribable to the promotion of condensation, etc. are eliminated.

More exactly, reaction products that are factors of promoting condensation, etc. in the reaction process or impurities coming from the starting materials are prematurely removed to prevent the condensation, etc. The process is made up of the following steps.

(1) STEP OF PRECIPITATION OF A PEROXOTITANIUM HYDRATE POLYMER

First, a suitable amount of a hydroxide peroxide solution is added to a soluble titanium compound such as titanium tetrachloride upon dilution with water to form a brown peroxo complex. Then, a basic substance such as ammonia is added to the peroxo complex to prepare a yellow aqueous solution of a peroxotitanium hydrate. Finally, this aqueous solution is let stand at normal temperature or heated for precipitation of a peroxotitanium hydrate polymer.

(2) STEP OF REMOVAL OF IONIC SUBSTANCES AND IMPURITIES

The liquid with the precipitated peroxotitanium hydrate polymer contained therein is washed or otherwise treated by filtration and washing to remove ammonium ions and chlorine ions contained therein or impurities derived from the starting materials.

(3) STEP OF FORMATION OF A CRYSTALLINE TITANIUM OXIDE PARTICLE

The precipitate of the peroxotitanium hydrate, from which ionic substances and impurities have been removed by the washing treatment, is heated at a temperature of 80° C. or higher under normal pressure or in an autoclave while the precipitate is kept in a slurried or dispersed state, thereby forming a crystalline titanium oxide particle.

Through the aforesaid steps, it is possible to form a crystalline titanium oxide particle and, hence, a crystalline titanium oxide particle dispersion useful for the formation, etc. at a low temperature of a titanium oxide film having improved properties.

For the peroxotitanium hydrate used herein, mention may be made of the titanium oxide-forming solutions prepared by A: PROCESS 1 OF PRODUCING A TITANIUM OXIDE-FORMING SOLUTION and B: PROCESS 2 OF PRODUCING A TITANIUM OXIDE-FORMING SOLUTION.

In what follows, the present invention will be explained with reference to the titanium oxide-forming solution prepared by A: PROCESS 1 OF PRODUCING A TITANIUM OXIDE-FORMING SOLUTION. It is noted, however, that the titanium oxide-forming solution produced by B: PROCESS 2 OF PRODUCING A TITANIUM OXIDE-FORMING SOLUTION, too, may be similarly used.

The soluble titanium compound herein used as the starting material, for instance, may include titanium tetrachloride, titanium sulfate, titanium nitrate and alkoxy titanium.

The amount of the hydrogen peroxide solution to be added to the aqueous solution of the soluble titanium compound should be at least 1 as represented in terms of the hydrogen peroxide-to-titanium molar ratio. At less than 1, peroxidation is not fully completed. In addition, some of the added hydrogen peroxide solution decomposes without taking any part in the reaction. It is thus desired that the hydrogen peroxide-to-titanium molar ratio be in excess of 1.

Almost momentarily upon the addition of the hydrogen peroxide solution to the soluble titanium-containing solution, peroxidization takes place, yielding a solution wherein the peroxotitanium hydrate is present primarily in the form of cations at pH 3 or less, and in the form of anions at pH 3 or higher. This is probably because the higher the pH, the more prematurely condensation takes place, so that an amorphous peroxotitanium hydrate polymer can be precipitated. When the basic substance is added, too, much time is needed at a low pH level for precipitation of the peroxotitanium hydrate polymer. It is thus preferable to add the basic substance until a pH level of 3 or higher is obtained. More preferably, the pH should be regulated to the neutral level.

When yellow precipitates are obtained from the transparent, yellow solution of peroxotitanium hydrate formed by the addition of the basic substance, it is preferable to let the solution standing at room temperature. If heating is applied, however, it is possible to promote hydrate precipitation. It is here noted that this precipitation can be further promoted by agitation.

At the step of removal from the precipitate-containing liquid of ammonium ions and chlorine ions contained therein or impurities derived from the starting material, techniques such as decantation, filtering and washing and centrifuging, reactions such as ion exchange reaction or techniques such as reverse osmosis may be used for removal of ionic substances.

Impurities should preferably be removed as much as possible, because a large amount of remnant impurities has an adverse influence on the stability and properties of the finally obtained aqueous solution of peroxotitanium hydrate. In particular, anions such as chlorine ions are considered to promote the condensation of the peroxotitanium hydrate. In some cases, insufficient removal of such anions causes the solution to become opaque or turbid. When cations such as ammonium ions remain, on the other hand, a peroxotitanium hydrate-containing transparent, yellow aqueous solution can be obtained if anions are fully removed.

Then, the precipitate-containing dispersion liquid or slurry is thermally treated. The heating temperature should preferably be at least 70° C. because, at a temperature of lower than 70° C., no sufficient formation of crystalline titanium oxide particles of anatase takes place. More preferably, the heating temperature should be between 80° C. and 200° C. At higher than 200° C., difficulty is involved in treating time control because anatase can precipitate within too short a time span. A preferable heating time at such temperatures should be between 5 minutes and 20 hours. If the dispersion or slurry is heated in an autoclave, it is then possible to produce crystalline titanium oxide particles within a short period of time. Autoclaving should preferably be carried out at a temperature of 100° C. to 200° C. inclusive.

For the treatment of the precipitates, they should remain undried, because the precipitates dehydrate and solidify upon drying, producing an adverse influence on the subsequent step of preparing a crystalline titanium oxide particle dispersion liquid.

When the precipitates are heated according to the process of the present invention, a particle dispersion solution is formed with crystalline particle formation.

The crystalline titanium oxide particle dispersion solution of the present invention is useful as a coating agent for materials incapable of any thermal treatment, because it can yield a crystalline titania film in simple coating operation. The thus obtained film may be used for various purposes, e.g., as protecting coatings and photocatalysts, and as a gas shielding member for synthetic resin films. With this solution, it is also possible to obtain a film of relatively high density and improved adhesion at a relatively low temperature.

The titanium oxide particle dispersion solution according to the present invention acts as a dispersing agent for various fine particles, and may be dispersed by ultrasonic means or other means inclusive of a ball mill upon mixed with solid fine particles. If other material is carried on or dispersed in a titanium oxide film obtained by coating, drying and firing of the dispersion, it is then possible to obtain a composite material. The dispersion solution of the present invention may be applied to every substrate: ceramic, porcelain, metal, plastic, fiber and building material substrates, and everything capable of standing up to thermal treatments suitable for particular purposes. With this dispersion solution, it is also possible to treat the interiors of porous materials and the surfaces of powders. Thus, the titanium oxide coating agent prepared according to the present invention may find applications in producing protective coatings for various material products, photocatalyst films, ultraviolet cut coatings, colored coating films, dielectric films, film sensors and titanium oxide sols.

The present invention will now be explained more specifically with reference to examples.

EXAMPLE 1-1

A 30% solution of hydrogen peroxide (20 ml) was added to and stirred with a solution (500 ml) of a 60% aqueous solution of titanium tetrachloride (5 ml) diluted with distilled water to prepare a transparent, brown solution. Ammonia water (1:9) was added dropwise to the solution to regulate the pH of the solution to 7, thereby preparing a transparent, yellow solution. The obtained solution was let stand at 25° C. for a whole day and night to obtain yellow precipitates.

Distilled water was added to the precipitates after filtered and washed to prepare a solution (about 150 ml), and a cation exchange resin and an anion exchange resin, each in an amount of 25 g, were charged into the solution, which was then let stand for 30 minutes for removal of cationic and anionic substances.

An $H^+$ substituted type resin obtained by treating Amberite IR120B ($Na^+$ substituted type, and made by Organo Co., Ltd.) with 2N hydrochloric acid for 1 hour was used for the cation ion exchange resin, and an $OH^-$ substituted type resin obtained by treating Amberite IRA410 ($Cl^-$ substituted type, and made by Organo Co., Ltd.) with IN sodium hydroxide for 1 hour was used for the anion exchange resin.

Figure 2:
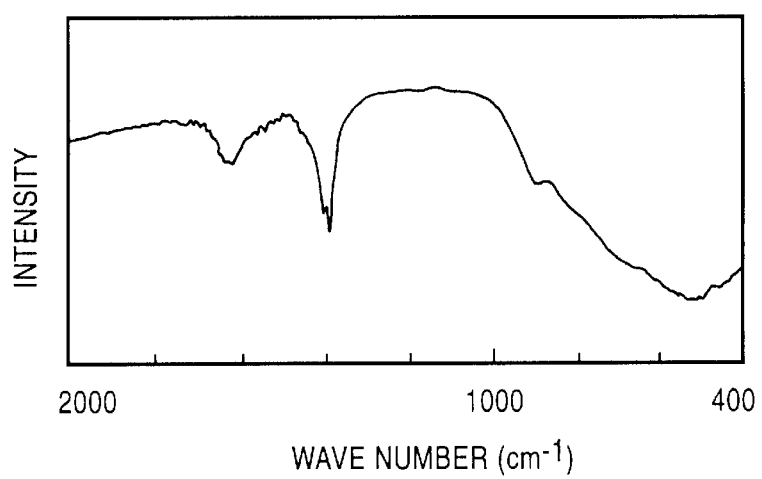
FIG. 2 is illustrative of the results of Fourier transform infrared absorption spectroscopy of the precipitate obtained in Example 1-1.

Powders obtained by drying the resultant yellow precipitates at 25° C. were measured with an X-ray diffactometer (RAD-B made by Rigaku Denki Co., Ltd.) using a copper target while it was operated at an acceleration voltage of 30 kV and with a current of 15 mA. The results are plotted in FIG. 1. The obtained precipitates were found to be in an amorphous state On the other hand, the powders obtained by drying at 25° C. were mixed with potassium bromide to prepare a tablet. According to the potassium bromide tablet method, the tablet was then measured using a Fourier transform infrared absorption spectrometer (FT/IR-5300 made by Nippon Bunko Co., Ltd.) in combination with a transmission technique. The results are plotted in FIG. 2. Absorption was found in the vicinity of 900 $cm^{-1}$, indicating the presence of peroxo groups.

Then, the ion exchange resins were removed by filtration, and distilled water was added to prepare a solution (about 180 ml), which was in turn cooled with ice water. Thereafter, a 30% solution of hydrogen peroxide (20 ml) was added to the solution, followed by cooling. After the lapse of 1 hour, a transparent, yellow solutioin (200 ml) containing titanium was obtained.

Figure 3:
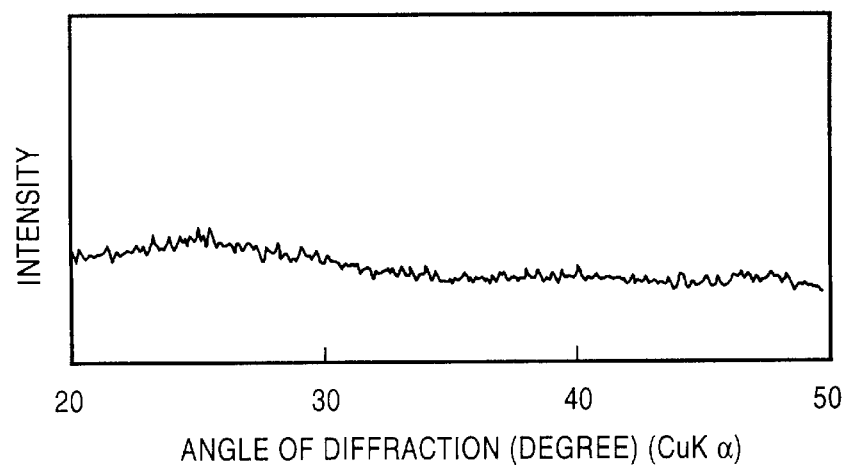
FIG. 3 is illustrative of the results of X-ray diffraction of the transparent, yellow liquid obtained in Example 1-2.
Figure 4:
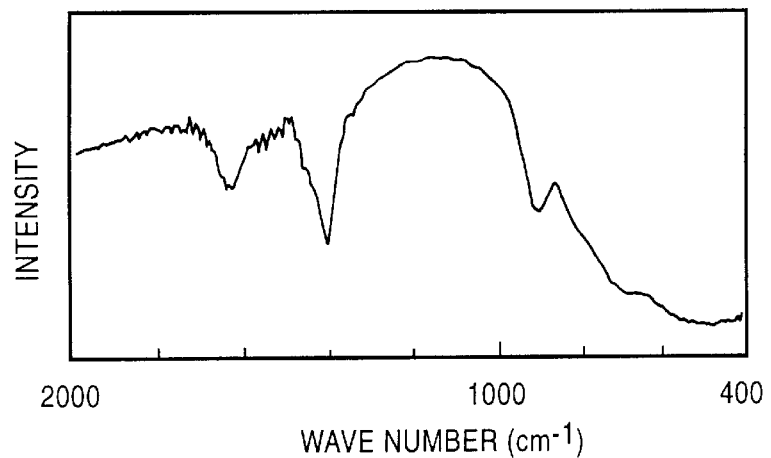
FIG. 4 is illustrative of the results of Fourier transform infrared absorption spectroscopy of the transparent, yellow liquid obtained in Example 1-2.

After a one-month or longer storage in a refrigerator at 7° C., the solution remained unchanged. Five days after preparation, the pH of the transparent, yellow solution was 5.1. Powders obtained by drying this solution at normal temperature, too, were similarly measured by X-ray diffraction. The results are plotted in FIG. 3. From the results of X-ray diffraction, it was found that the powders were in a noncrystalline state having no peak indicative of crystallinity. The results of Fourier transform infrared spectroscopy are also plotted in FIG. 4. Absorption was found in the vicinity of 900 cm$^{-1}$, indicating the presence of a number of peroxo groups.

EXAMPLE 1-2

The transparent, yellow solution obtained in Example 1-1 was closed up in a glass vessel, and heated at 100° C. for 5 hours to obtain a translucent pale-yellow solution. The pH of this solution was 8.8. Powders obtained by drying the solution at normal temperature were examined by X-ray diffraction as in Example 1-1. It was consequently found that crystalline anatase was formed and the obtained solution was an anatase sol.

EXAMPLE 1-3

The solution obtained in Example 1-1 was coated and dried four times on a slide glass, and then thermally treated at varying temperatures to prepare a film of about 1 µm in thickness. Through X-ray diffraction, the film was found to be in an amorphous state at lower than 200° C., and the presence of anatase was confirmed at 200° C. or higher. The film dried or thermally treated at normal temperature or higher did not peel off even when subjected to cellophane tape peeling testing.

In the cellophane peeling testing, a cellophane tape (made by Nichiban Co., Ltd.) was applied over the formed film after injured every 1 mm by a cutter knife. Then, the cellophane tape was peeled from the film in a vertical direction at a speed of 1 cm/sec. to observe the surface of the film and the surface of the cellophane tape, thereby making examination of whether the film peeled off or not.

EXAMPLE 1-4

A 30% solution of hydrogen peroxide (20 ml) was added to and stirred with a solution (500 ml) of a 60% aqueous solution of titanium tetrachloride (5 ml) diluted with distilled water to prepare a transparent, brown solution. Ammonia water (1:9) was added dropwise to the solution to regulate the pH of the solution to 7, thereby preparing a transparent, yellow solution. Thereafter, this solution was heated at 50° C. for 2 hours to obtain yellow precipitates. Then, the precipitates were filtered and washed. One hundred and thirty (130) ml of a liquid containing those yellow precipitates was let stand at 15° C. together with a 30% solution of hydrogen peroxide (20 ml). Twelve (12) hours later, a transparent, yellow solution (150 ml) was obtained. The temperature of the solutioin after the hydrogen peroxide solution had been added thereto increased to a high of 20° C. After the lapse of a few days, the pH and viscosity of the solution were 5.0 and 8 cp, respectively.

COMPARATIVE EXAMPLE 1-1

Ammonia water (1:9) was added dropwise to a solution (500 ml) obtained by diluting a 60% aqueous solution of titanium tetrachloride (5 ml) with distilled water to regulate the solution's pH to 7, thereby precipitating a white gel form of titanium hydroxide, followed by filtering and drying. A solution (130 ml) of the precipitates in distilled water was adjusted to a liquid temperature of 15° C., and then let stand at that temperature with a 30% solution of hydrogen peroxide (20 ml) added thereto. Twelve (12) hours later, a titanium-containing yellow solution (150 ml) was obtained. In the meantime, the solution temperature increased to a high of 41° C. Five days after preparation, the pH of the solution was 5.0. This solution was jellified into a gel with a viscosity of about 28,000 cp; it could hardly be used as a coating agent.

EXAMPLE 2-1

Titanium dioxide was used as the starting titanium material. A twofold-diluted solution (15 ml) of ammonia water having a concentration of 25% by weight was added to a weighed 0.8 g of titanium dioxide (Titanium Dioxide P25 made by Nippon Aerosil Co., Ltd.), and a hydrogen peroxide solution (40 ml) having a concentration of 30% by weight was added together with distilled water thereto, thereby preparing a solution (100 ml). This solution was stirred and then let stand at 25° C. for 2 days for dissolution, thereby obtaining a transparent, yellow solution. The concentrations of titanium and ammonium were 0.1 mol/l and 1.1 mol/l, respectively.

Then, an H$^+$ substituted type cation exchange resin (30 g, and Amberite IR118 made by Organo Co., Ltd.) washed with distilled water was slowly charged under agitation into the obtained solution to regulate its pH to 5. After separation of the added cation exchange resin, the solution was irradiated with ultrasonic waves to decompose hydrogen peroxide until the solution's pH increased to 8. It is here noted that decomposition of hydrogen peroxide could be ascertained by the generation of air bubbles from the solution.

Subsequently, the solution's pH was regulated to 5 by the same operation as that for cation removal with the aforesaid cation exchange resin. Following this, operations for decomposition of hydrogen peroxide and cation removal with the cation exchange resin were carried out twice for each operation, thereby obtaining a titanium oxide-forming aqueous solution of pH 5. The concentration of ammonium in the resultant solution was 0.01 mol/l.

Figure 5:
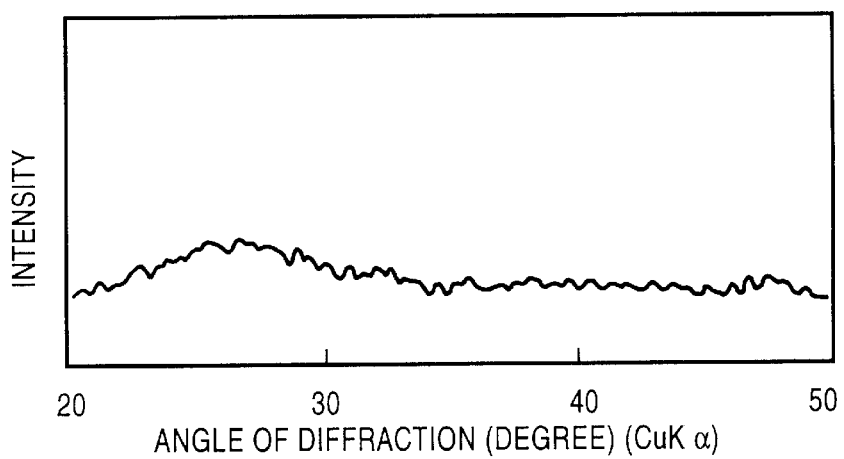
FIG. 5 is illustrative of the results of X-ray diffraction of a powder obtained by drying the titanium oxide-forming solution obtained in Example 2-1.

Powders obtained by drying the resultant solution at 25° C. were measured with an X-ray diffactometer (RAD-B made by Rigaku Denki Co., Ltd.) using a copper target, while it was operated at an acceleration voltage of 30 kV and with a current of 15 mA. The results are plotted in FIG. 5. The obtained liquid were found to be of noncrystalline nature.

Figure 6:
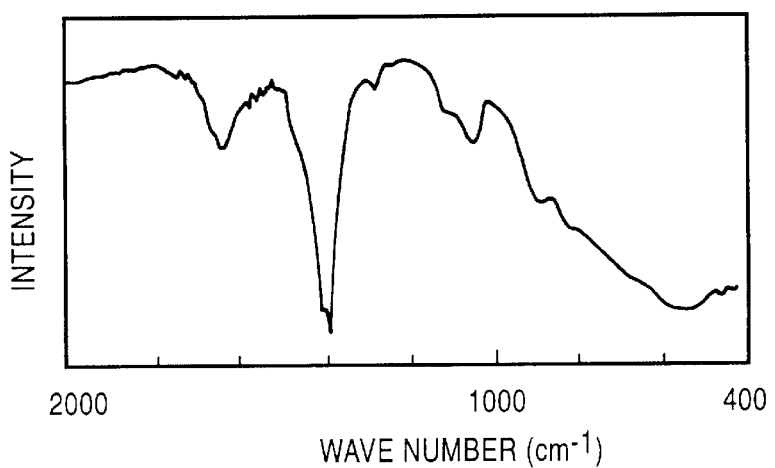
FIG. 6 is illustrative of the results of spectroscopy of the titanium oxide-forming solution obtained in Example 2-1, which was carried out using a Fourier transform infrared absorption spectroscopic system.

On the other hand, the powders obtained by drying at 25° C. were mixed with potassium bromide to prepare a tablet. According to the potassium bromide tablet method, the tablet was then measured using a Fourier transform infrared absorption spectrometer (FT/IR-5300 made by Nippon Bunko Co., Ltd.) in combination with a transmission technique. The results are plotted in FIG. 6. Absorption was found in the vicinity of 900 cm$^{-1}$, indicating the presence of peroxo groups.

Even when the solution was let stand at 25° C. for 30 days, the properties of the solution remained unchanged with nothing precipitated.

Throughout the examples and comparative examples, the concentrations of titanium and ammonium were measured as follows.

MEASUREMENT OF THE CONCENTRATION OF TITANIUM

An arbitrary amount of specimen was sampled out, and diluted two hundred times with distilled water. Then, an ICP emission spectroscopic analyzer (ICPS-2000 made by Shimadzu Corporation) was used to determine the concentration of titanium in the specimen from calibration curves prepared on the basis of standard solutions with concentrations of 10 ppm, 20 ppm and 40 ppm obtained from a titanium standard solution (having a concentration of 1,000 ppm and made by Wako Junyaku Co., Ltd.).

MEASUREMENT OF THE CONCENTRATION OF AMMONIUM

An arbitrary amount of specimen was first sampled out. Then, the specimen was diluted ten times after hydrogen peroxide, if contained therein, was completely decomposed. The solution (1 ml) was placed in a vessel, in which distilled water (20 ml) and an aqueous solution (1 ml) of zinc sulfate having a concentration of 0.35 mol/l were added to the solution and an alkali solution of sodium carbonate (30 g) and sodium carbonate (25 g) dissolved in distilled water (200 ml) was further added thereto, thereby regulating its pH to 10.5.

Then, a 1.3 ml/l solution of sodium phenolate (10 ml) and a 0.15 ml/l solution of disodium ethylenediaminetetraacetate (1 ml) were added to and stirred with the solution, followed by addition under agitation of a 1% by volume solution of sodium hypochlorite (5 ml) and distilled water, thereby obtaining a solution (50 ml). After the lapse of 30 minutes, the solution was filtered. The absorbance at 630 nm of the resulting filtrate was measured, using a spectrophotometer (UV-2100 made by Shimadzu Corporation).

Apart from this, a guaranteed reagent type of ammonium chloride was dissolved and diluted to prepare a standard solution, which was then used to make a calibration curve as in the case of the test solution, thereby determining the concentration of ammonium in the test solution.

EXAMPLE 2-2

Metallic titanium was used as the starting titanium material. A twofold-diluted solution (17 ml) of ammonia water having a concentration of 25% by weight was added to a weighed 0.48 g of metallic titanium powders (made by Nippon Aerosil Co., Ltd.), and a hydrogen peroxide solution (20 ml) having a concentration of 30% by weight was added together with distilled water thereto, thereby preparing a solution (100 ml). This solution was stirred and then let stand at 25° C. for 24 hours for dissolution, thereby obtaining a transparent, yellow solution. The concentrations of titanium and ammonium in the solution were 0.1 mol/l and 0.6 mol/l, respectively.

Then, an $H^+$ substituted type cation exchange resin (30 g, and Amberite IR118 made by Organo Co., Ltd.) washed with distilled water was slowly charged under agitation into the obtained solution. After separation of the added cation exchange resin upon pH 5 reached, the solution was irradiated with ultrasonic waves to decompose hydrogen peroxide. Upon pH 8 reached, a further 5 g of the cation exchange resin was again charged into the solution to bring its pH down to 4.

Following this, operations for decomposition of hydrogen peroxide and cation removal with the cation exchange resin were carried out twice for each operation, thereby obtaining a titanium oxide-forming aqueous solution of pH 5.

The concentrations of titanium and ammonium in the resultant solution was 0.1 mol/l and 0.01 mol/l, respectively.

Powders obtained by drying the resultant solution were found to be noncrytalline in nature as measured with an X-ray diffractometer as in Example 1.

Moreover, the powders were measured using a Fourier transform infrared absorption spectrometer as in Example 1. Absorption was found in the vicinity of 900 $cm^{-1}$, indicating the presence of peroxo groups.

EXAMPLE 2-3

Titanium tetrachloride was used as the starting titanium material. A tenfold-diluted solution of ammonia water having a concentration of 25% by weight was added dropwise to a solution (500 ml) obtained by diluting an aqueous solution (5 ml) of titanium tetrachloride having a concentration of 60% by weight) with distilled water to regulate its pH to 7, thereby precipitating a white gel form of titanium hydroxide. This titanium hydroxide was washed and filtered. Distilled water was added to the filtered-out residues to obtain a solution in the total amount of 150 ml.

Then, a fourfold-diluted solution (25 ml) of ammonia water having a concentration of 25% by weight and a hydrogen peroxide solution (20 ml) having a concentration of 30% by weight were added together with distilled water to the above solution, which was in turn let stand. After 12 hours, a titanium-containing yellow solution (250 ml) was obtained.

The concentrations of titanium, ammonium and chlorine in the resulting titanium-containing solution were 0.1 mol/l, 0.38 mol/l and 0.0086 mol/l, respectively.

Then, an $H^+$ substituted type cation exchange resin (50 g, and Amberite IR118 made by Organo Co., Ltd.) washed with distilled water was charged into the obtained solution for ammonium ion removal. After separation and removal of the added cation exchange resin, a hydrogen peroxide solution (10 ml) having a concentration of 30% by weight was added to the solution while held at 7° C., thereby obtaining a transparent, yellow aqueous solution of peroxotitanic acid. The concentration of ammonium in this solution was 0.011 mol/l.

Powders obtained by drying the resultant solution were found to be noncrytalline in nature as measured with an X-ray diffractometer as in Example 2-1.

Moreover, the powders were measured using a Fourier transform infrared absorption spectrometer as in Example 2-1. Absorption was found in the vicinity of 900 $cm^{-1}$, indicating the presence of peroxo groups.

EXAMPLE 2-4

Titanium tetrachloride was used as the starting titanium material. A tenfold-diluted solution of ammonia water having a concentration of 25% by weight was added dropwise to a solution (500 ml) obtained by diluting an aqueous solution (5 ml) of titanium tetrachloride having a concentration of 60% by weight) with distilled water to regulate its pH to 7, thereby precipitating a white gel form of titanium hydroxide. This titanium hydroxide was washed and filtered. Distilled water was added to the filtered-out residues to obtain a solution in the total amount of 150 ml. While the solution was cooled with ice water, a hydrogen peroxide solution (20 ml) having a concentration of 30% by weight was added thereto for a 12-hour reaction therewith, thereby obtaining a translucent, yellow titanium oxide-forming solution. An $OH^-$ substituted type anion exchange resin (30 g), which was obtained by treating an anion exchange resin (Amberite IRA410 made by Organo Co., Ltd.) with 1N sodium hydroxide for 1 hour and drying it, was charged into the resulting titanium oxide-forming solution, which was in turn let stand for 3 hours. After separation of the anion exchange resin, a fourfold-diluted solution (25 ml) of ammonia water having a concentration of 25% by weight and a hydrogen peroxide solution (10 ml) having a concentration of 30% by weight were added to the solution, which was thereafter let stand. After 12 hours, a yellow titanium-containing solution (250 ml) was obtained. The concentrations of titanium, ammonium and chlorine in the resulting titanium-containing solution were 0.1 mol/l, 0.39 mol/l and 0.0039 mol/l, respectively.

Then, an H+substituted type cation exchange resin (50 g, and Amberite IR118 made by Organo Co., Ltd.) washed with distilled water was charged into the obtained solution for removal of residual ammonium ions. After separation and removal of the added cation exchange resin, a hydrogen peroxide solution (10 ml) having a concentration of 30% by weight was added to the solution while held at 7° C., thereby obtaining a transparent, yellow solution. The concentration of ammonium in this solution was 0.0131 mol/l.

Powders obtained by drying the resultant solution were found to be noncrytalline in nature as measured with an X-ray diffractometer as in Example 2-1.

Moreover, the powders were measured using a Fourier transform infrared absorption spectrometer as in Example 2-1. Absorption was found in the vicinity of 900 $cm^{-1}$, indicating the presence of peroxo groups.

EXAMPLE 2-5

Titanium tetrachloride was used as the starting titanium material. A hydrogen peroxide solution (20 ml) having a concentration of 30% by weight was added to and stirred with a solution (50 ml) obtained by diluting an aqueous solutioin (5 ml) of titanium tetrachloride having a concentration of 60% by weight to prepare a transparent, brown solution. A tenfold-diluted solution of ammonia water having a concentration of 25% by weight was added dropwise to this solution to regulate its pH to 7. Following this, the obtained solution was let stand for a whole day and night to obtain yellow precipitates, which were then washed and filtered. Distilled water was added to the filtered-out residues to obtain a solution in the total amount of 150 ml.

Then, an $OH^-$ substituted type anion exchange resin (30 g), which was obtained by treating an anion exchange resin (Amberite IRA410 made by Organo Co., Ltd.) with IN sodium hydroxide for 1 hour and drying it, was charged into the resulting titanium compound dispersed solution, which was in turn let stand for 30 minutes. After separation of the anion exchange resin with a synthetic resin net for chlorine ion removal, a fourfold-diluted solution (25 ml) of ammonia water having an ammonia concentration of 25% by weight and a hydrogen peroxide solution (20 ml) having a concentration of 30% by weight were added together with distilled water to a solution (180 ml) obtained by diluting the above solutioin with distilled water. After 12 hours, a transparent, yellow titanium compound solution (250 ml) was obtained.

The concentrations of titanium, ammonium and chlorine in the resulting solution were 0.1 mol/l, 0.41 mol/l and 0.005 mol/l, respectively.

Then, an $H^+$ substituted type cation exchange resin (50 g, and Amberite IR118 made by Organo Co., Ltd.) washed with distilled water was charged into the obtained solution, which was then let stand for 1 hour for ammonium ion removal. After separation and removal of the added cation exchange resin, a hydrogen peroxide solution (10 ml) having a concentration of 30% by weight was added to the solution while held at 7° C., thereby obtaining a transparent, yellow solution. The concentration of ammonium in this solution was 0.0131 mol/l.

Powders obtained by drying the resultant solution were found to be noncrystalline as measured with an X-ray diffractometer, as in Example 2-1.

Moreover, the powders were measured using a Fourier transform infrared absorption spectrometer as in Example 2-1. Absorption was found in the vicinity of 900 $cm^{-1}$, indicating the presence of peroxo groups.

EXAMPLE 2-6

The liquid (50 ml) obtained in Example 2-2 was closed up in a glass vessel, and heated at 100° C. for 5 hours to obtain a translucent, pale-yellow liquid. Powders obtained by drying the liquid were examined by X-ray diffraction as in Example 2-1. It was consequently found that crystalline anatase was formed and the obtained liquid was an anatase sol.

EXAMPLE 2-7

Metallic titanium was used as the starting titanium material. Metallic titanium powders (made by Wako Junyaku Co., Ltd.) were placed in four vessels, 0.48 g for each vessel. To three of these vessels, fourfold-diluted solutions of ammonia water having a concentration of 25% by weight were added in the respective amounts of 5 ml, 10 ml and 15 ml. To all the vessels, a hydrogen peroxide solution (40 ml) having a concentration of 30% by weight and distilled water were added to prepare solutions (100 ml). These solutions were stirred, and then let stand at 25° C. for 20 hours.

The concentrations of titanium in these solutions were 0.1 mol/l while the concentrations of aluminum were 0 mol/l, 0.18 mol/l, 0.37 mol/l and 0.55 mol/l. The samples having an ammonium concentration of not more than 0.18 mol/l were not entirely dissolved, each leaving a small amount of insolubles. The samples having an ammonium concentration of at least 0.37 mol/l were completely dissolved, each yielding an entirely transparent solution.

Then, an $H^+$ substituted type cation exchange resin (30 g, and Amberite IR118 made by Organo Co., Ltd.) washed with distilled water was slowly charged into each solution, thereby regulating its pH to 5. After separation of the added cation exchange resin, the solution was irradiated with ultrasonic waves emitted from an ultrasonic wave irradiator to decompose hydrogen peroxide. As hydrogen peroxide decomposed, the solution's pH increased. Upon pH 8 reached, a further 5 g of the cation exchange resin was charged into the solution to bring the solution's pH down to 5, followed by separation of the cation exchange resin. Then, the decomposition of hydrogen peroxide and the treatment using the cation exchange resin were repeated twice for each, thereby obtaining a transparent, yellow solution of pH 5. The concentration of ammonium in the solution was 0.01 mol/l.

Powders obtained by drying the resultant solution were found to be noncrytalline in nature as measured with an X-ray diffractometer as in Example 2-1.

Moreover, the powders were measured using a Fourier transform infrared absorption spectrometer as in Example 2-1. Absorption was found in the vicinity of 900 $cm^{-1}$, indicating the presence of peroxo groups.

EXAMPLE 2-8

Titanium dioxide was used as the starting titanium material. Titanium dioxide (Titanium Dioxide P25 made by Nippon Aerosil Co., Ltd.) was charged into three vessels, 0.8 g per vessel. To the vessels, fourfold-diluted solutions of ammonia water having a concentration of 30% by weight were added in the respective amounts of 5 ml, 10 ml and 15 ml. Moreover, a hydrogen peroxide solution (40 ml) having a concentration of 30% by weight and distilled water were added to and stirred with each solution. In this way, a solution was prepared in an amount of 100 ml. The concentrations of titanium in the obtained solutions were 0.1 mol/l while the concentration of ammonium were 0.18 mol/l, 0.37 mol/l and 55 mol/l, respectively. The samples having an ammonium ion concentration of not more than 0.37 mol/l were not completely dissolved, and a sample with no ammonia added thereto was hardly dissolved, yielding nothing more than an opaque, white suspension.

Then, an $H^+$ substituted type cation exchange resin (30 g, and Amberite IR118 made by Organo Co., Ltd.) washed with distilled water was slowly charged into each solution, thereby regulating its pH to 5. After separation of the added cation exchange resin, the solution was irradiated with ultrasonic waves emitted from an ultrasonic wave irradiator to decompose a part of hydrogen peroxide. As hydrogen peroxide decomposed, the pH increased. Upon pH 8 reached, a further 5 g of the cation exchange resin was charged into the solution to bring its pH down to 5, followed by separation of the cation exchange resin. Then, the treatment for decomposition of hydrogen peroxide by ultrasonic irradiation and the treatment using the cation exchange resin were repeated twice per each treatment to obtain a transparent, yellow aqueous solution of pH 5. The concentration of ammonium in the solution was 0.01 mol/l.

EXAMPLE 2-9

A transparent solution as obtained in Example 2-2 were divided into 20 ml portions, to which ammonia water was added in such a way as to yield solutions having ammonium ion concentrations of 0.136 mol/l, 0.021 mol/l, 0.0284 mol/l, 0.0358 mol/l, 0.0423 mol/l and 0.055 mol/l, respectively. Each solution was put in a closed vessel, and then heated at 100° C. for 6 hours.

Figure 7:
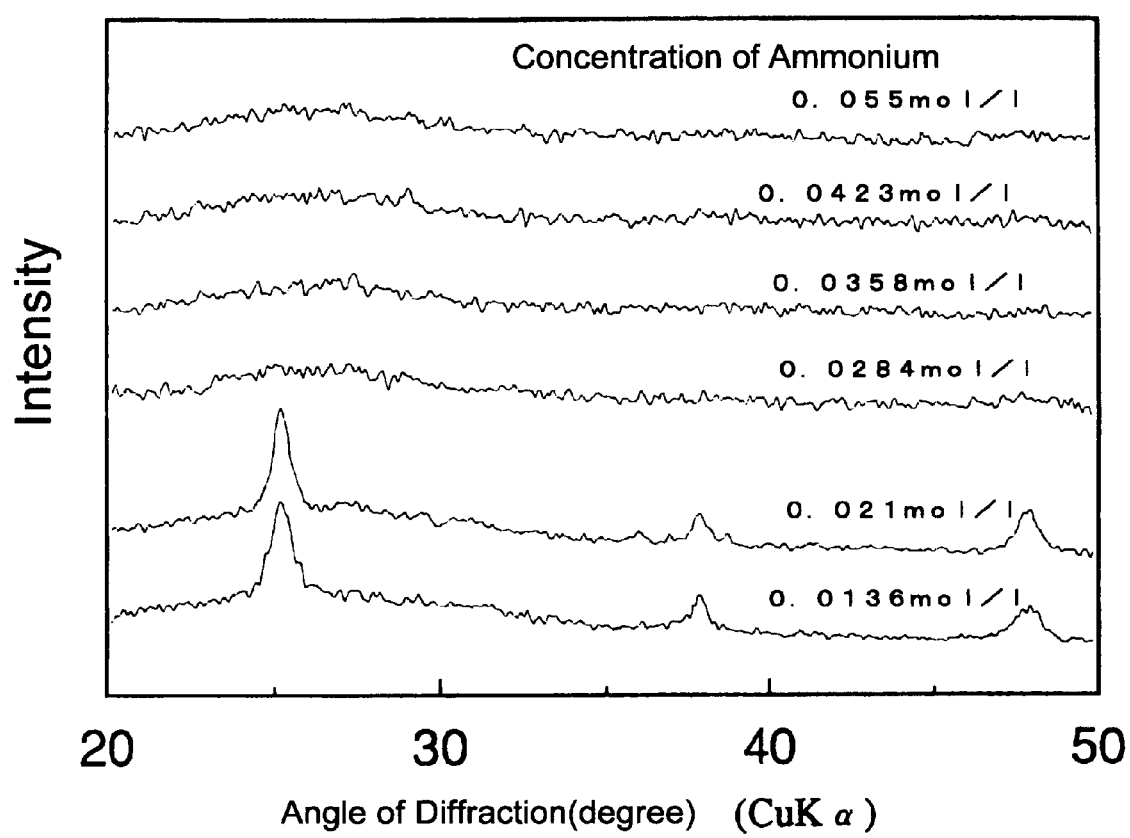
FIG. 7 is illustrative of the results of X-ray diffraction of a powder obtained by drying the titanium oxide-forming solution obtained in Example 2-2.

Shown in FIG. 7 are the results of X-ray diffractometry of powders obtained by drying the solution at 25° C., using an X-ray diffractometer.

Figure 8:
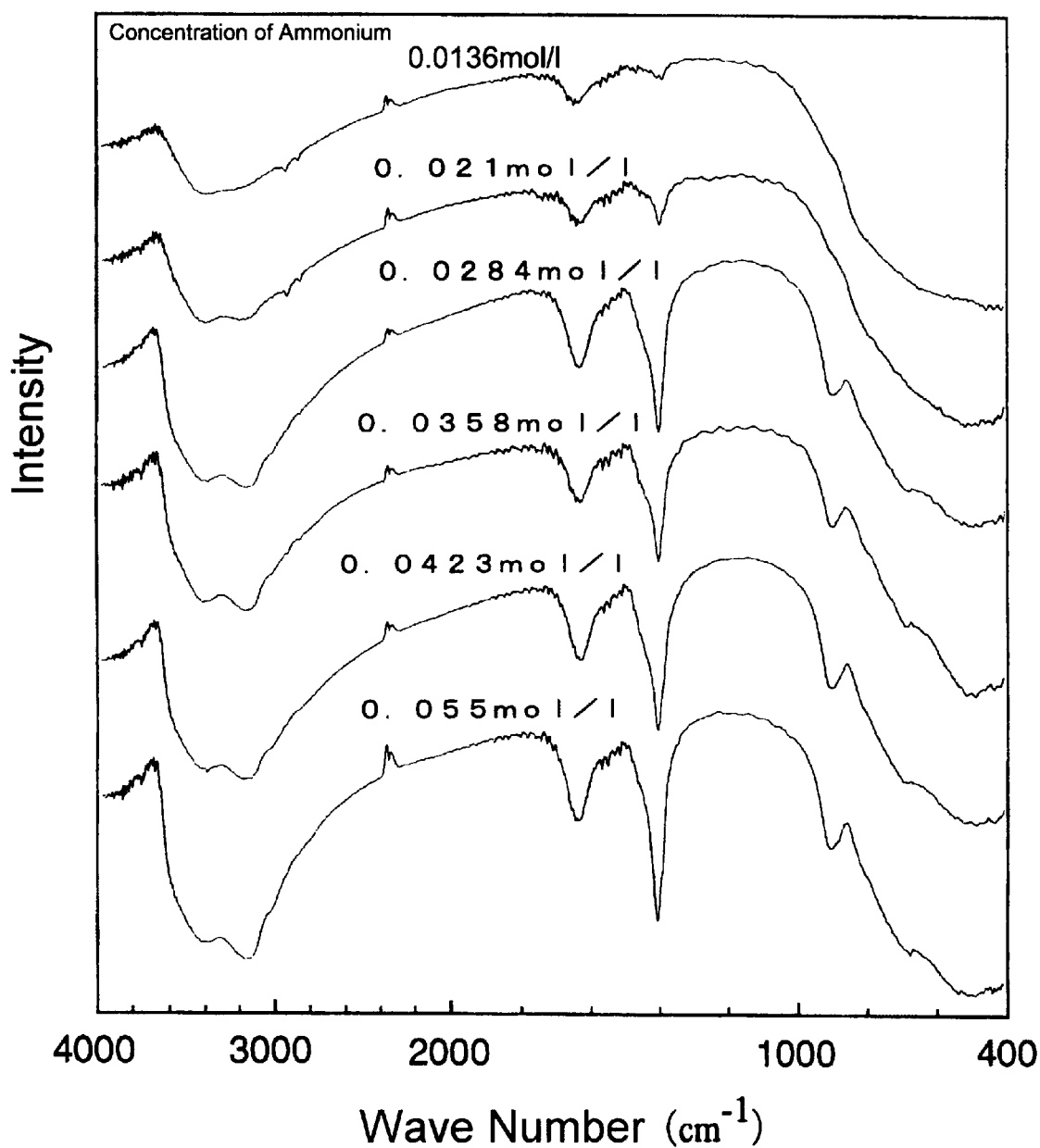
FIG. 8 is illustrative of the results of spectroscopy of the titanium oxide-forming solution obtained in Example 2-2, which was carried out using a Fourier transform infrared absorption spectroscopic system.

Shown in FIG. 8 are Fourier transform infrared absorption spectra of the same powders as obtained in Example 2-1. The samples having an ammonium concentration of 0.0284 mol/l or greater were found to be noncrystalline in nature as measured by X-ray diffraction. The results of Fourier transform infrared spectroscopy showed that absorption was found in the vicinity of 900 $cm^{-1}$, indicating the presence of peroxo groups.

On the other hand, the samples having an ammonium concentration of not more than 0.021 mol/l were found to be present in the form of an anatase crystal-containing sol. In other words, it was only when the concentration of ammonium was lower than the concentration of titanium that the anatase sol was obtained.

Referring here to samples to which ammonia was added while no thermal treatment was carried out at 100° C., samples having an ammonium concentration of not more than 0.0423 mol/l remained transparent and unchanged at normal temperature over longer than 1 month. However, a sample having an ammonium concentration of 0.055 mol/l became turbid and unstable. It was only when the concentration of ammonium was at most one-half the concentration of titanium that a stable peroxotitanic acid aqueous solution was obtained. At a concentration higher than that, no long-term stability was achievable.

EXAMPLE 2-10

A transparent, yellow solution obtained as in Example 2-2 and having a titanium concentration of 0.1 mol/l was heated at 70° C. for 3 hours to obtain a yellow gel form of precipitates. After washing with distilled water, distilled water was added to the gel to obtain a solution (80 ml). While the solution was cooled down to 7° C. and held at that temperature, a hydrogen peroxide solution (20 ml) having a concentration of 30% by weight was added thereto, thereby obtaining a transparent, yellow titanium compound solution. The concentration of ammonium in the solution was 0.02 mol/l.

Powders obtained by drying the resultant solution were found to be noncrytalline in nature as measured with an X-ray diffractometer as in Example 2-1.

Moreover, the powders were measured using a Fourier transform infrared absorption spectrometer as in Example 2-1. Absorption was found in the vicinity of 900 $cm^{-1}$, indicating the presence of peroxo groups.

EXAMPLE 2-11

Metallic titanium was used as the starting titanium material. To a weighed 0.48 g of metallic titanium powders (made by Wako Junyaku Co., Ltd.), a twofold-diluted solution (7 ml) of ammonia water having a concentration of 25% by weight were added together with a hydrogen peroxide solution (20 ml) having a concentration of 30% by weight and distilled water, thereby obtaining a solution (100 ml). The solution was stirred, and then let stand at 25° C. for 24 hours to obtain a transparent, yellow solution. The concentration of titanium in the solution was 0.1 mol/l while the concentration of aluminum was 0.6 mol/l.

Then, an $H^+$ substituted type cation exchange resin (30 g, and Amberite IR118 made by Organo Co., Ltd.) was slowly charged under agitation into the resulting solution. After separation of the added cation exchange resin upon pH 5 reached, the solution was irradiated with ultrasonic waves to decompose hydrogen peroxide, thereby obtaining a solution 1. Then, a further 2 g of the cation exchange resin was re-charged into solution 1. After separation of the cation exchange resin upon pH 5 reached, the solution was irradiated with ultrasonic waves to decompose hydrogen peroxide, thereby obtaining a solution 2. Then, a further 2 g of the cation exchange resin was charged into solution 2. After separation of the cation exchange resin upon pH 5 reached, the solution was irradiated with ultrasonic waves to decompose hydrogen peroxide, thereby obtaining a solution 3.

Solutions 1, 2 and 3 were each a transparent, yellow solution. The ammonium ion concentration was 0.058 mol/l for solution 1, 0.043 mol/l for solution 2, and 0.020 mol/l for solution 3. Solutions 2 and 3 remained unchanged over longer than 1 month, while solution 1 started to become turbid from the second day after let stand at 25° C., yielding a solid precipitate.

Powders obtained by drying the resultant solution were found to be noncrytalline in nature as measured with an X-ray diffractometer as in Example 2-1.

Moreover, the powders were measured using a Fourier transform infrared absorption spectrometer as in Example 2-1. Absorption was found in the vicinity of 900 $cm^{-1}$, indicating the presence of peroxo groups.

EXAMPLE 2-12

Metallic titanium was used as the starting titanium material. A weighed 0.48 g of metallic titanium powders (made by Wako Junyaku Co., Ltd.) was charged into a solution obtained by dissolving a guaranteed reagent type sodium hydroxide (made by Wako Junyaku Co., Ltd.) in 50 g of distilled water. Then, a hydrogen peroxide solution (20 ml) having a concentration of 30% by weight and distilled water were added, thereby obtaining a solution (100 ml). The solution was stirred, and then let stand at 25° C. for 15 hours to obtain a transparent, yellow solution. The concentration of titanium in the solution was 0.1 mol/l while the concentration of sodium was 0.6 mol/l.

Then, an $H^+$ substituted type cation exchange resin (60 g, and Amberite IR118 made by Organo Co., Ltd.) was slowly charged under agitation into the resulting solution. After separation of the added cation exchange resin upon pH 5 reached, the solution was irradiated with ultrasonic waves to decompose hydrogen peroxide. Upon pH 8 reached, a further 4 g of the cation exchange resin was re-charged into the solution. After separation of the cation exchange resin upon pH 5 reached, the solution was irradiated with ultrasonic waves to decompose hydrogen peroxide. Upon pH 8 reached, a further 4 g of the cation exchange resin was charged into the solution and the solution was irradiated with ultrasonic waves to bring its pH down to 5. The ultrasonic treatment after resin removal and the treatment using the cation exchange resin were repeated three times for each treatment to bring the pH up to 6, thereby obtaining a transparent, yellow titanium oxide-forming solution. The concentration of sodium in the solution was 0.01 mol/l.

Powders obtained by drying the resultant solution were found to be noncrytalline in nature as measured with an X-ray diffractometer as in Example 2-1.

Moreover, the powders were measured using a Fourier transform infrared absorption spectrometer as in Example 2-1. Absorption was found in the vicinity of 900 $cm^{-1}$, indicating the presence of peroxo groups.

EXAMPLE 2-13 AND COMPARATIVE EXAMPLE 2-1

Metallic titanium was used as the starting titanium material. A twofold-diluted solution (7 ml) of ammonia water having a concentration of 25% by weight was added together with a hydrogen peroxide solution (20 ml) having a concentration of 30% by weight and distilled water to a weighed 0.48 g of metallic titanium powders (made by Wako Junyaku Co., Ltd.) to prepare a solution (100 ml). The solution was stirred, and then let stand at 25° C. for 24 hours to obtain a transparent, yellow solution. The concentrations of titanium and ammonium in the solution were 0.1 mol/l and 0.6 mol/l, respectively.

Then, varying amounts of a $H^+$ substituted type cation exchange resin (Amberite IR118 made by Organo Co., Ltd.) were added to and stirred with the solution. After the lapse of 10 minutes, the cation exchange resin was removed. The thus obtained solutions were measured for pH, titanium concentration, ammonium ion concentration. The results are shown in Table 1.

All samples were found to have hydrogen peroxide residues therein, and undergo continued foaming. After 3 days, foaming came to an end with pH increases. Throughout the samples, precipitates and turbidity appeared.

TABLE 1

| Sample | Cation Exchange Resin, Amount (g) | pH | After 3 days pH | Concentration of Ti (mol/l) | Concentration of $NH_4^+$ (mol/l) |
|---|---|---|---|---|---|
| 1 | 15 | 7 | 11 | 0.1 | 0.10 |
| 2 | 20 | 5 | 9 | 0.096 | 0.065 |
| 3 | 25 | 4 | 7 | 0.094 | 0.058 |
| 4 | 35 | 3.5 | 6 | 0.084 | 0.045 |
| 5 | 45 | 3 | 4 | 0.055 | 0.033 |
| 6 | 55 | 2.5 | 4 | 0.014 | 0.017 |
| 7 | 65 | 2.5 | 4 | 0.004 | 0.011 |

COMPARATIVE EXAMPLE 2-2

A titanium oxide-forming solution was prepared following Example 2-1 with the exception that the cation exchange resin treatment was not carried out. When the solution was let stand at 25° C. for 5 days, the solution was found to undergo yellowing with cloudy gel formation. However, the solution obtained in Example 2-1 remained unchanged even after let stand at normal temperature for 30 days.

EXAMPLE 3-1

A 30% solution of hydrogen peroxide (20 ml) was added to and stirred with a solution (500 ml) of a 60% aqueous solution of titanium tetrachloride (5 ml) diluted with distilled water to prepare a transparent, brown solution. Ammonia water (1:9) was added dropwise to the solution to regulate the pH of the solution to 7, thereby preparing a transparent, yellow solution. The obtained solution was let stand at 25° C. for a whole day and night to obtain yellow precipitates.

Distilled water was added to the precipitates after filtered and washed to prepare a solution (about 150 ml), and a cation exchange resin and an anion exchange resin, each in an amount of 25 g, were charged in the solution, which was then let stand for 30 minutes for removal of cationic and anionic substances.

An $H^+$ substituted type resin obtained by treating Amberite IR120B ($Na^+$ substituted type, and made by Organo Co., Ltd.) with 2N hydrochloric acid for 1 hour was used for the cation ion exchange resin, and an $OH^-$ substituted type resin obtained by treating Amberite IRA410 ($Cl^-$ substituted type, and made by Organo Co., Ltd.) with 1N sodium hydroxide for 1 hour was used for the anion exchange resin.

Figure 9:
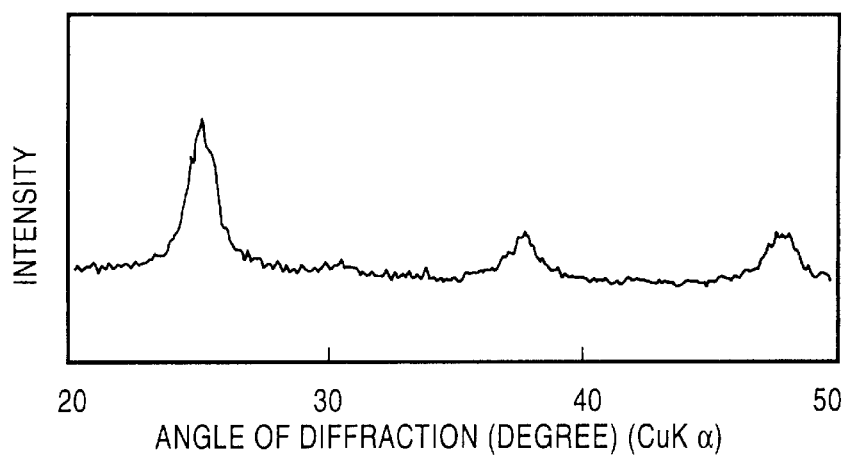
FIG. 9 is illustrative of the results of X-ray 25 diffraction of a powder obtained by drying the translucent, pale-yellow liquid obtained in Example 3-1.

The obtained solution (150 ml) containing yellow precipitates was closed up in a glass vessel, in which it was then heated at 100° C. for 5 hours. Thereupon, a translucent, pale-yellow solution was obtained. Powders obtained by drying the resultant solution were measured with an X-ray diffactometer (RAD-B made by Rigaku Denki Co., Ltd.) using a copper target while it was operated at an acceleration voltage of 30 kV and with a current of 15 mA. The results are plotted in FIG. 9. As can be seen from FIG. 9, there was a peak indicative of crystalline anatase, showing that the dried product obtained from the translucent, pale-yellow solution contained crystalline anatase. Crsytal diameter was found to be 8 nm from the full width at half maximum of the diffraction peak.

When the obtained solution was coated on a slide glass, and then dried and thermally treated thereon at 60° C., it was found that a titanium oxide film could be obtained.

EXAMPLE 3-2

A 30% solution of hydrogen peroxide (20 ml) was added to and stirred with a solution (500 ml) of a 60% aqueous solution of titanium tetrachloride (5 ml) diluted with distilled water to prepare a transparent, brown solution. Ammonia water (1:9) was added dropwise to the solution to regulate the pH of the solution to 7, thereby preparing a transparent, yellow solution. The obtained solution was let stand at 25° C. for a whole day and night to obtain yellow precipitates.

Distilled water was added to the precipitates after filtered and washed to prepare a solution (about 150 ml), which was then treated following Example 1-1 with the exception that it was heated at 100° C. for 5 hours while it was closed up in a glass vessel. Consequently, there could be obtained a dispersion containing an anatase type crystalline titanium oxide, as in Example 3-1.

EXAMPLE 3-3

Figure 10:
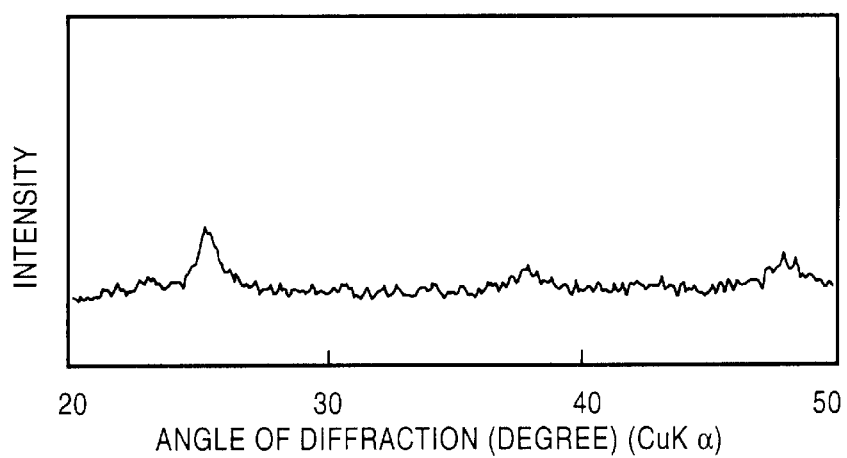
FIG. 10 is illustrative of the results of X-ray diffraction of a powder obtained by drying the translucent, pale-yellow liquid obtained in Example 3-2.

A 30% solution of hydrogen peroxide (20 ml) was added to and stirred with a solution (500 ml) of a 60% aqueous solution of titanium tetrachloride (5 ml) diluted with distilled water to prepare a transparent, brown solution. Ammonia water (1:9) was added dropwise to the solution to regulate the pH of the solution to 7, thereby preparing a transparent, yellow solution. The obtained solution was heated at 60° C. for 2 hours to prepare a transparent, yellow solution, which was heated at 60° C. for 2 hours into a solution (150 ml) containing yellow precipitates. The solution was closed up in a glass vessel, in which it was heated at 75° C. for 12 hours to obtain a translucent, yellow solution. The results of X-ray diffraction of powders obtained by drying the solution are shown in FIG. 10. As can be seen from FIG. 10, there was a peak indicative of crystalline anatase, showing that the translucent, pale-yellow solution contained crystalline anatase.

COMPARATIVE EXAMPLE 3-1

A 30% solution of hydrogen peroxide (20 ml) was added to and stirred with a solution (500 ml) of a 60% aqueous solution of titanium tetrachloride (5 ml) diluted with distilled water to prepare a transparent, brown solution. Ammonia water (1:9) was added dropwise to the solution to regulate the pH of the solution to 7, thereby preparing a transparent, yellow solution. The obtained solution was let stand at 60° C. for 2 hours to obtain yellow precipitates. The precipitates were then fully washed and filtered.

Figure 11:
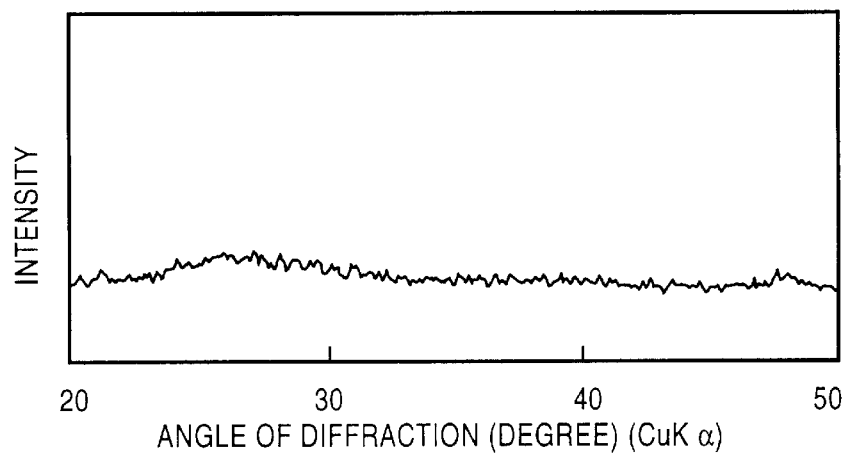
FIG. 11 is illustrative of the results of X-ray diffraction of a powder obtained by drying the translucent, pale-yellow liquid obtained in Comparative Example 3-1.

Distilled water was added to the yellow precipitates to prepare a solution (about 150 ml), which was then treated following Example 3-1 with the exception that it was heated at 60° C. for 12 hours while it was closed up in a glass vessel, thereby obtaining an opaque, yellow solution. The results of X-ray diffraction of powders obtained by drying the solution are shown in FIG. 11. As can be seen from FIG. 10, there was no definite peak indicative of a crystalline substance, showing that the solution contained no crystalline anatase.

I claim:

1. A process of producing a titanium oxide-forming solution, comprising the steps of:
    adding a basic substance having hydroxyl groups in excess of the amount of titanium to metallic titanium; and then
    adding a hydrogen peroxide solution thereto, thereby forming a solution, in which solution the concentration of cations other than titanium ion, a titanium-containing ion and a hydrogen ion is at most one-half the concentration of titanium ion and titanium-containing ion, and wherein the concentration of cations derived from a remaining basic substance is in the range of $1/10$ to $1/2$ of the concentration of titanium.

2. A process of producing a titanium oxide-forming solution, comprising the steps of:
    adding a basic substance having hydroxyl groups in excess of an amount of titanium, to metallic titanium or a solid titanium compound containing at least one of oxygen and hydrogen; and then
    adding a hydrogen peroxide solution thereto, thereby forming a second solution; and
    repeating twice or more a step for removal of cations other than titanium ion, a titanium-containing ion and hydrogen ion from the solution and decomposition of an excessive portion of the hydrogen peroxide solution while the second solution is maintained at pH 3.0 to 10, and wherein the concentration of cations derived from a remaining basic substance is in the range of $1/10$ to $1/2$ of the concentration of titanium.

3. The process of producing a titanium oxide-forming solution according to claim 2, wherein the solid titanium compound is a titanium hydrate.

4. The process of producing a titanium oxide-forming solution according to claim 3, wherein the basic substance having hydroxyl groups in an amount that is at least twice an amount of titanium is added.

5. The process of producing a titanium oxide-forming solution according to claim 4, wherein peroxotitanium is contained in the second solution.

6. The process of producing a titanium oxide-forming solution according to claim 3, wherein peroxotitanium is contained in the second solution.

7. The process of producing a titanium oxide-forming solution according to claim 2, wherein the basic substance having hydroxyl groups in an amount that is at least twice an amount of titanium is added.

8. The process of producing a titanium oxide-forming solution according to claim 7, wherein peroxotitanium is contained in the second solution.

9. The process of producing a titanium oxide-forming solution according to claim 2, wherein peroxotitanium is contained in the second solution.

10. A process of producing a titanium oxide coating agent, comprising the steps of:
    adding a basic substance having hydroxyl groups in excess of the amount of titanium to metallic titanium or a solid titanium compound containing at least one of oxygen and hydrogen; and then
    adding a hydrogen peroxide solution thereto, thereby forming a second solution;
    removing cations contained in said second solution other than titanium ion, a titanium-containing ion and a hydrogen ion; then
    repeating at least twice a decomposition of an excessive portion of the hydrogen peroxide solution while the second solution is maintained at pH 3 to 10, thereby allowing a concentration of cations other than titanium ion, a titanium-containing ion and hydrogen ion to be at most one-half a concentration of titanium, and wherein the concentration of cations derived from a remaining basic substance is in the range of $1/10$ to $1/2$ of the concentration of titanium; and then
    thermally treating the second solution at a temperature of 80° C. or higher for precipitation of an anatase particle.

11. A process of producing a solution with a crystalline titanium oxide particle dispersed therein comprising the steps of:

adding a hydrogen peroxide solution to a titanium-containing starting aqueous solution to form a peroxotitanium complex; then adding a basic substance to the peroxotitanium complex to obtain a solution which is in turn let stand or heated, thereby forming a precipitate of a peroxotitanium hydrate polymer, and wherein the concentration of cations derived from a remaining basic substance is in the range of 1/10 to 1/2 of the concentration of titanium; then removing from the precipitate at least a dissolved component derived from the titanium-containing aqueous solution other than water; and heating the peroxotitanium hydrate polymer at a temperature of 70° C. or higher while water remains unseparated therefrom.

12. The process of producing a solution with a crystalline titanium oxide particle dispersed therein according to claim 11, wherein removal of the dissolved component is carried out by water washing or an ion exchange reaction.

13. The process of producing a solution with a crystalline titanium oxide particle dispersed therein according to claim 11, further comprising:

removing a dissolved component derived from the basic substance added for hydrate formation other than water.

14. The process of producing a solution with a crystalline titanium oxide particle dispersed therein according to claim 13, wherein removal of the dissolved component is carried out by water washing or an ion exchange reaction.

* * * * *